(12) United States Patent
Nakano et al.

(10) Patent No.: US 11,937,012 B2
(45) Date of Patent: Mar. 19, 2024

(54) IMAGING DEVICE, IMAGING PROGRAM, AND IMAGING METHOD

(71) Applicant: NIDEC COPAL CORPORATION, Tokyo (JP)

(72) Inventors: Ryuzo Nakano, Tokyo (JP); Taizo Takiguchi, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 17/890,267

(22) Filed: Aug. 18, 2022

(65) Prior Publication Data
US 2023/0054882 A1    Feb. 23, 2023

(30) Foreign Application Priority Data

Aug. 19, 2021    (JP) ................. 2021-133843

(51) Int. Cl.
*H04N 5/77* (2006.01)
*G03B 11/04* (2021.01)
*H04N 23/56* (2023.01)
*H04N 23/71* (2023.01)
*H04N 23/76* (2023.01)

(52) U.S. Cl.
CPC ............. *H04N 5/77* (2013.01); *G03B 11/043* (2013.01); *H04N 23/56* (2023.01); *H04N 23/71* (2023.01); *H04N 23/76* (2023.01)

(58) Field of Classification Search
CPC .......... H04N 5/77; H04N 23/56; H04N 23/71; H04N 23/76; H04N 23/55; G03B 11/043
See application file for complete search history.

(56) References Cited

U.S. PATENT DOCUMENTS

| | | | | |
|---|---|---|---|---|
| 5,666,568 A | * | 9/1997 | Saito | .................... G03B 11/041 396/448 |
| 5,729,288 A | * | 3/1998 | Saito | ...................... H04N 25/63 348/E5.079 |
| 6,052,536 A | * | 4/2000 | Arai | ................... G03B 7/09908 396/233 |
| 7,717,630 B1 | * | 5/2010 | Wan | ....................... G03B 17/00 396/448 |

(Continued)

FOREIGN PATENT DOCUMENTS

JP    2010278548 A    12/2010

*Primary Examiner* — Chiawei Chen
(74) *Attorney, Agent, or Firm* — HAUPTMAN HAM, LLP

(57) ABSTRACT

To reduce increased consumption of the recording capacity of a recording medium to record generated image data, an imaging device includes an imaging element and an image processor that receive subject light through an opening in a housing and generate image data, a recording controller that records the image data generated by the imaging processor onto a memory card, a lens cover movable to a position at which the lens cover covers the opening to restrict the subject light from entering the imaging element, and a determiner that detects a position of the lens cover based on the image data generated by the imaging processor and determines whether the lens cover covers the opening. The recording controller stops recording the image data onto the memory card when the determiner determines that the lens cover covers the opening.

8 Claims, 8 Drawing Sheets

(56) References Cited

U.S. PATENT DOCUMENTS

| | | | | |
|---|---|---|---|---|
| 7,871,209 | B1* | 1/2011 | Sampathkumaran | G03B 17/00 |
| | | | | 396/448 |
| 9,217,864 | B2* | 12/2015 | Bell | B60S 1/56 |
| 9,430,823 | B1* | 8/2016 | Hanning | G06T 7/0004 |
| 10,999,504 | B1* | 5/2021 | Vacquerie | H04N 23/62 |
| 11,539,885 | B2* | 12/2022 | Vacquerie | H04N 23/667 |
| 2002/0171756 | A1* | 11/2002 | Bigler | H04N 23/60 |
| | | | | 348/373 |
| 2005/0231609 | A1* | 10/2005 | Sato | H04N 5/772 |
| | | | | 348/222.1 |
| 2007/0035778 | A1* | 2/2007 | Yoshizawa | H04N 1/23 |
| | | | | 358/302 |
| 2007/0222884 | A1* | 9/2007 | Mori | H04N 1/212 |
| | | | | 386/E5.072 |
| 2009/0109350 | A1* | 4/2009 | Koyama | H04N 9/3155 |
| | | | | 348/759 |
| 2012/0044399 | A1* | 2/2012 | Hirai | H04N 25/44 |
| | | | | 348/E5.022 |
| 2015/0335274 | A1* | 11/2015 | Chang | A61B 5/6826 |
| | | | | 600/479 |
| 2016/0234415 | A1* | 8/2016 | Huang | H04N 23/81 |
| 2019/0287463 | A1* | 9/2019 | Zhang | G09G 3/3258 |
| 2021/0122494 | A1* | 4/2021 | Hessling-Von Heimendahl | |
| | | | | H05B 47/20 |
| 2021/0250516 | A1* | 8/2021 | Vacquerie | H04N 23/90 |

* cited by examiner

IMAGING DEVICE, IMAGING PROGRAM, AND IMAGING METHOD

RELATED APPLICATIONS

The present application claims priority to Japanese Application Number 2021-133843, filed Aug. 19, 2021, the disclosure of which is hereby incorporated by reference herein in its entirety.

BACKGROUND

Technical Field

The present invention relates to an imaging device, an imaging program, and an imaging method.

Description of the Background

Surveillance cameras are installed in various places such as nursing care facilities, hospitals, factories, and stores for crime and disaster prevention. Such surveillance cameras are to be operated with privacy protection of individuals who are the subjects to be photographed.

Patent Literature 1 describes a surveillance camera system that switches between an image (mask image) that has undergone a mask process for privacy protection and an original image that has not undergone the mask process, and displays the mask image or the original image on a monitor.

CITATION LIST

Patent Literature

Patent Literature 1: Japanese Unexamined Patent Application Publication No. 2010-278548

BRIEF SUMMARY

However, the surveillance camera system in Patent Literature 1 records a generated mask image and the original image onto a recording medium, consuming a large portion of the recording capacity of the recording medium.

An imaging device according to an aspect of the present invention includes an imaging unit that receives subject light through an opening in a housing and generates image data, a recording controller that records the image data generated by the imaging unit onto a recording medium, a light shield movable to a position at which the light shield covers the opening to restrict the subject light from entering the imaging unit, and a determiner that detects a position of the light shield based on the image data generated by the imaging unit and determines whether the light shield covers the opening. The recording controller stops recording the image data onto the recording medium when the determiner determines that the light shield covers the opening.

A program according to an aspect of the present invention is a program for causing processes to be performed. The processes include receiving, with an imaging unit, subject light through an opening in a housing and generating image data, recording the generated image data onto a recording medium, determining, based on the generated image data, whether a light shield is at a position at which the light shield covers the opening to restrict the subject light from entering the imaging unit, and stopping recording the image data onto the recording medium when the subject light is determined to be restricted from entering the imaging unit.

An imaging method according to an aspect of the present invention includes receiving, with an imaging unit, subject light through an opening in a housing and generating image data, recording the generated image data onto a recording medium, determining, based on the image data generated by the imaging unit, whether a light shield is at a position at which the light shield covers the opening to restrict the subject light from entering the imaging unit, and stopping recording the image data onto the recording medium when the light shield is determined to cover the opening.

One or more aspects of the present invention are directed to an imaging device that stops recording image data when determining that its light shield covers the opening based on the image data. This can reduce excess consumption of the recording capacity of the recording medium.

DETAILED DESCRIPTION

First Embodiment

An imaging device according to a first embodiment of the present invention will be described in detail with reference to the drawings.

The imaging device may be used for any purpose, and may be installed in, for example, hospitals, nursing care facilities, factories, and stores as a surveillance camera or a monitoring camera. The imaging device is switchable between an imaging state and a non-imaging state. More specifically, the imaging device is switchable between a closed state in which light cannot enter an imaging optical system and an open state in which light can enter the imaging optical system. When the imaging device is switched to the non-imaging state (closed state), a person to be photographed can recognize that the imaging device is in the non-imaging state.

Figure 1A:
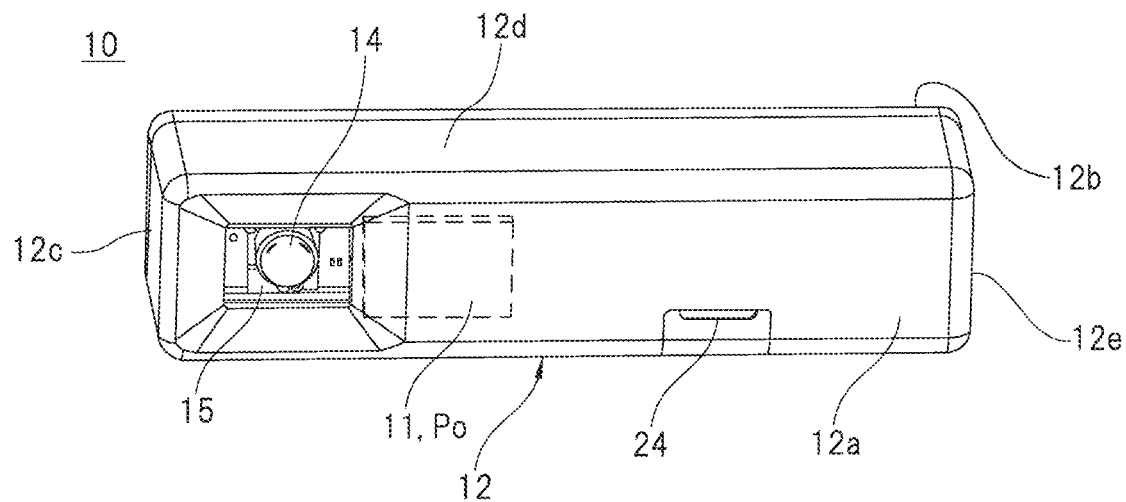
FIGS. 1A and 1B are external perspective views of an imaging device according to one or more embodiments.
Figure 1B:
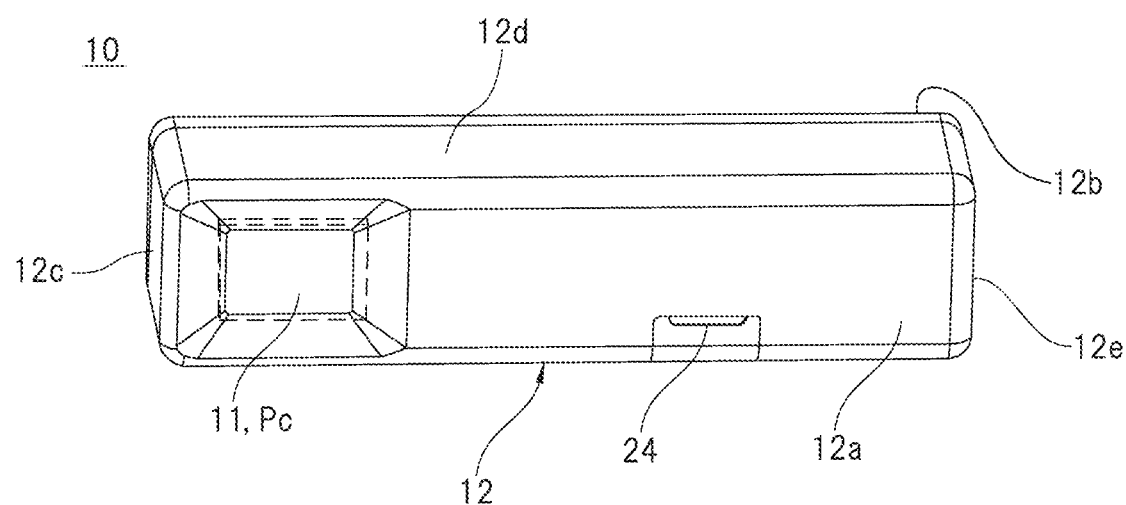
Figure 2A:
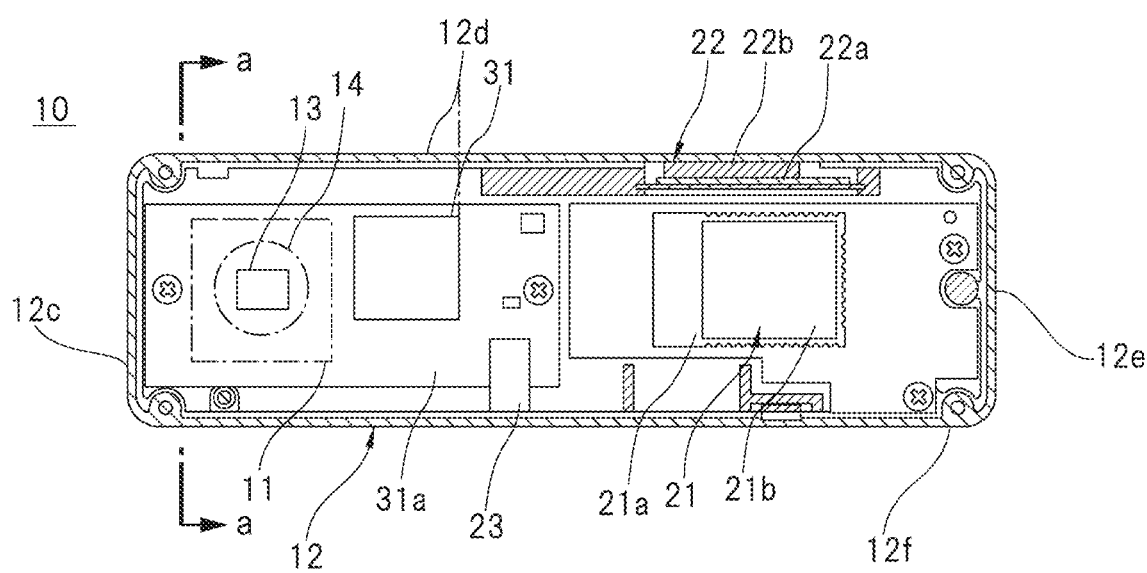
FIGS. 2A and 2B are plan views of the imaging device according to one or more embodiments.
Figure 2B:
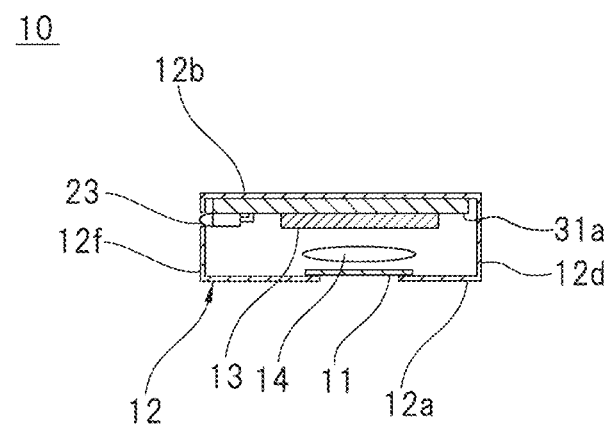

FIGS. 1A and 1B are external perspective views of an imaging device 10. FIG. 1A is an external perspective view of the imaging device 10 in the open state. FIG. 1B is an external perspective view of the imaging device 10 in the closed state. FIG. 2A is a plan view of the imaging device 10. FIG. 2B is a cross-sectional view of the imaging device 13 taken along line a-a in FIG. 2A.

As shown in FIGS. 1A to 2B, the imaging device 10 includes a substantially rectangular housing 12. The housing 12 has a front surface 12a, a back surface 12b, and side surfaces 12c, 12d, 12e, and 12f that meet the sides of the front surface 12a.

The housing 12 has, on the front surface 12a, a card slot 24 to receive a memory card 48 (refer to FIG. 3) and an opening 15.

As shown in FIGS. 2A and 2B, the housing 12 in the imaging device 10 accommodates a lens cover 11, an imaging element 13 that is an image sensor such as a complementary metal-oxide semiconductor (CMOS) and a charge-coupled device (CCD), and a lens (imaging optical system) 14 that focuses light from a subject (subject light) onto an imaging surface of the imaging element 13. The opening 15 in the front surface 12a of the housing 12 is located on the optical axis of the lens 14. The subject light passing through the opening 15 enters the imaging element 13 through the lens (imaging optical system) 14.

The imaging element 13 performs photoelectric conversion of the received subject light to an image signal and outputs the image signal. An image processor 35 (refer to FIG. 3) described later subjects the output image signal to various processes to generate image data. More specifically, the imaging element 13 and the image processor 35 function as an imaging unit that receives the subject light entering through the opening 15 in the housing 12 and generates image data.

The lens cover 11 is located along the optical axis of the lens 14 between the lens 14 and the opening 15 to open or close the opening 15. The lens cover 11 is movable to either an open position Po at which the opening 15 is open or a closed position Pc at which the opening 15 is closed. The lens cover 11 moves on a plane orthogonal to the optical axis of the lens 14. When the lens cover 1I moves to the open position Po as shown in FIG. 1A, the lens cover 11 moves away from the optical axis of the lens 14, and the opening 15 on the optical axis of the lens 14 is open. Thus, the lens 14 can be exposed through the opening 15 in the housing 12, and the subject light can enter the imaging element 13 through the lens 14.

When the lens cover 11 moves to the closed position Pc as shown in FIG. 1B, the lens cover 11 closes the opening 15 in the housing 12. Thus, the lens 14 can be covered with the lens cover 11, and the lens 14 in the housing 12 can be protected. The lens cover 11 functions as a light shield that restricts the subject light from entering the imaging element 13 when the lens cover 11 is at the closed position Pc as shown in FIG. 1B. The lens cover 11 is also referred to as a lens barrier or a shutter.

As shown in FIGS. 2A and 2B, the housing 12 accommodates a first wireless communication module 21, a second wireless communication module 22, a control unit 31, and a light source 23, in addition to the lens cover 11, the imaging element 13, and the lens 14 described above. The first wireless communication module 21 includes a printed circuit board (substrate) 21a with an antenna and an integrated circuit component 21b mounted on the printed circuit board 21a. The second wireless communication module 22 includes a printed circuit board (substrate) 22a with an antenna and an integrated circuit component 22b mounted on the printed circuit board 22a. The imaging element 13, the control unit 31, and the light source 23 are mounted on a substrate 31a. The substrate 31a is located adjacent to the back surface 12b of the housing 12.

The control unit 31 includes a central processing unit (CPU) and a memory. The control unit 31 is a processor that may read and execute a control program prerecorded on a recording medium 37 (refer to FIG. 3), such as a flash memory, to control various components in the imaging device 10. A process performed by the control unit 31 will be described in detail later.

The light source 23 is, for example, a light-emitting diode (LED). The light source 23 emits light for an indicator to allow a user to recognize the state of operation (for example, photographing) of the imaging device 10. As shown in FIG. 2B, the light source 23 emits light for an indicator toward the outside of the housing 12 from the side surface 12f different from the front surface 12a including the opening 15 in the housing 12.

When a predetermined photographing condition is satisfied, the imaging device 10 opens the lens cover 11 to start photographing. The photographing condition includes a wireless tag 40 (refer to FIG. 3), such as an integrated circuit (IC) tag, approaching a predetermined range. The photographing condition may include, for example, receiving a recording signal transmitted from a mobile terminal such as a smartphone, receiving an infrared ray transmitted from a remote control, and detecting a voice with predetermined information with a microphone (not shown).

Control System in Imaging Device 10

Figure 3:
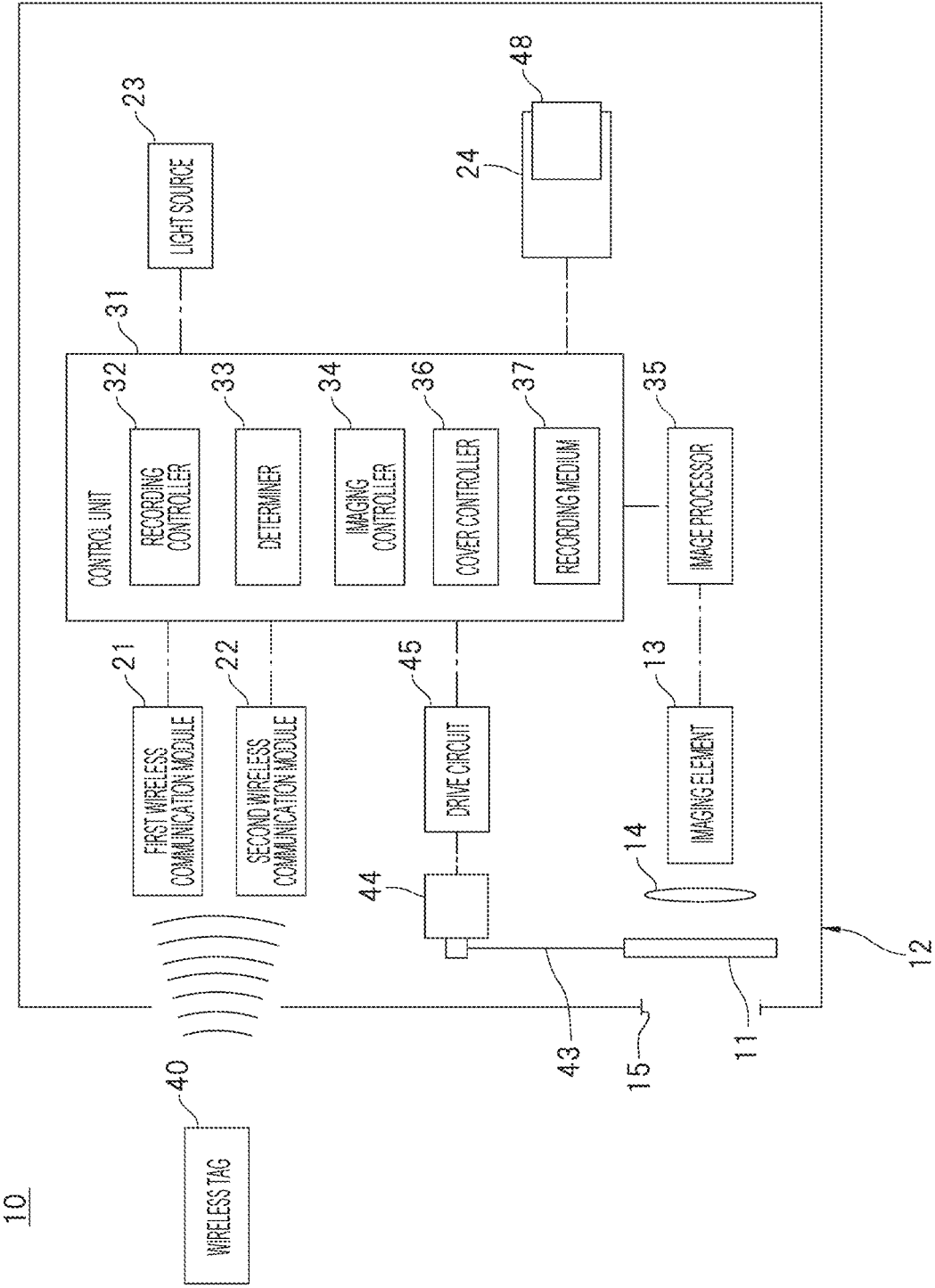
FIG. 3 is a block diagram of a control system in an imaging device according to a first embodiment.

FIG. 3 is a block diagram of a control system in the imaging device 10. As shown in FIG. 3, the control unit 31 in the imaging device 10 includes a recording controller 32, a determiner 33, an imaging controller 34, a cover controller 36, and the recording medium 37. The control unit 31 is connected to the first wireless communication module 21 and the second wireless communication module 22. The recording controller 32 performs a recording process (image recording process) for recording an image data generated by the image processor 35 onto the memory card 48. The determiner 33 performs a process for detecting the position of the lens cover 11 based on image data generated by the image processor 35, and determining whether the lens cover 11 covers the opening 15 (the imaging device 10 is in the closed state or in the open state) based on the detected result. The imaging controller 34 controls driving of the imaging element 13 and causes the imaging element 13 to generate an image signal, and performs imaging control that causes the image processor 35 to generate image data based on the image signal. The cover controller 36 controls covering and uncovering with the lens cover 11.

A link assembly 43 connects the lens cover 11 that opens or closes the opening 15 to an actuator 44. The actuator 44 is connected to a drive circuit 45. The drive circuit 45 is connected to the control unit 31, and drives the actuator 44 in response to a control signal (drive signal) from the cover controller 36.

Process Performed by Control Unit 31

When the photographing condition (the external wireless tag 40, which is a transmitter, approaching a predetermined range from the first wireless communication module 21 and the second wireless communication module 22) is satisfied, the imaging device 10 starts photographing as described above. In other words, when a target person that is a subject carries the wireless tag 40 and enters a predetermined photographing area, the imaging device 10 moves the lens cover 11 from the closed position Pc to the open position Po and photographs the person.

More specifically, the control unit 31 in the imaging device 10 determines whether the person carrying the wireless tag 40 enters the predetermined photographing area based on the intensities of signals received from the first wireless communication module 21 and the second wireless communication module 22. When the intensities of the received signals exceed a predetermined threshold Xa, the control unit 31 determines that the person has entered the photographing area, or specifically, the photographing condition is satisfied. When the intensities of the received signals are less than a predetermined threshold X, which is less than the predetermined threshold Xa, the control unit 31 determines that the person has left the photographing area, or specifically, the photographing condition is not satisfied. A communication protocol used between the first wireless communication module 21 and the wireless tag 40 or a communication protocol used between the second wireless communication module 22 and the wireless tag 40 may be, for example, Bluetooth (registered trademark) or Wi-Fi (registered trademark).

When the photographing condition is satisfied, the cover controller 36 causes the drive circuit 45 to drive the actuator 44, and moves the lens cover 11 to the open position Po with the link assembly 43. The imaging element 13 receives the subject light entering through the opening 15, and outputs an image signal to the image processor 35. The image processor 35 is an image signal processor (ISP). The image processor 35 subjects the image signal output from the imaging element 13 to known image processes, such as an analog-to-digital (AD) conversion process, a signal amplification process, and a white balance process, to generate image data.

When the photographing condition is not satisfied, the cover controller 36 causes the drive circuit 45 to drive the actuator 44, and moves the lens cover 11 to the closed position Pc with the link assembly 43.

When the lens cover 11 in the imaging device 10 is at the closed position Pc and the imaging device 10 is in the closed state, the recording controller 32 in the control unit 31 performs a stop process for stopping recording the image data generated by the image processor 35 onto the memory card 48. To perform the stop process, the determiner 33 in the control unit 31 performs a determination process for detecting the position of the lens cover 1I and determining whether the subject light is restricted from entering the imaging element 13 (specifically, whether the lens cover 11 is at the closed position Pc or at the open position Po).

Determination Process

The determiner 33 determines that the lens cover 11 is at the closed position Pc when the image data generated by the image processor 35 satisfies a first condition and a second condition described below. In other words, the determiner 33 determines that the lens cover 11 covers the opening 15.

The first condition includes an image area reconstructed by the image data satisfying a predetermined condition. The second condition includes the light emitted from the light source 23 being detected within the image area reconstructed by the image data.

First Condition

When the luminance of an area with a proportion exceeding 80% of the entire image area, which is a predetermined proportion area, is less than a threshold, the determiner 33 determines that the image area satisfies the first condition. In this case, the threshold of the luminance is determined in advance based on, for example, the results of testing and simulation, and recorded on the recording medium 37. When the image area satisfies the first condition, the amount of light entering the imaging element 13 is small, and the lens cover 11 may close the opening 15. The determiner 33 thus determines whether the lens cover 11 closes the opening 15 under the second condition described later.

The first condition is not limited to the condition described above. For example, the first condition may include a predetermined proportion area of a central portion of the image area being darker than a predetermined proportion area of a peripheral portion of the image area. In this case, when the absolute value of a difference between the luminance of the predetermined proportion area of the central portion of the image area (first luminance) and the luminance of the predetermined proportion area of the peripheral portion of the image area (second luminance) exceeds a threshold, the determiner 33 determines that the central portion of the image area is darker than the peripheral portion of the image area and determines that the image area satisfies the first condition. In this case as well, the threshold of the luminance is determined in advance based on, for example, the results of testing and simulation, and recorded on the recording medium 37.

The first condition may include the image area not including a main subject. In this case, the determiner 33 detects the presence or absence of the main subject in the image area by, for example, known techniques such as face recognition. When the main subject is not detected, the determiner 33 determines that the image area satisfies the first condition.

Second Condition

The determiner 33 determines that the second condition is satisfied when the luminance at a predetermined position in the image area exceeds a predetermined value. The predetermined position in the image area corresponds to an entry position of light on the imaging surface when part of light emitted from the light source 23 travels inside the housing 12, is reflected from the lens cover 11 at the closed position Pc, and enters the imaging element 13. When the luminance at the predetermined position corresponding to the entry position of light exceeds the predetermined value, the determiner 33 detects the entry of the light emitted from the light source 23, which is not ambient light from outside the imaging device 10. In other words, the determiner 33 determines that the lens cover 11 is at the closed position Pc. The predetermined position and the predetermined value of luminance are determined in advance based on, for example, the results of testing and simulation, and recorded on the recording medium 37.

When the determiner 33 determines that the image area satisfies the first condition and the second condition as described above, the determiner 33 determines that the lens cover 11 covers the opening 15. When the determiner 33 determines that the lens cover 11 covers the opening 15, the recording controller 32 performs the stop process.

Stop Process

Through the stop process, the recording controller 32 stops recording image data generated by the image processor 35 onto the memory card 48. After the process, the recording controller 32 does not record, onto the memory card 48, image data with a low level of priority obtained by photographing with the lens cover 11 covering the opening 15. This saves the capacity of the memory card 48.

During a period in which recording the image data onto the memory card 48 is stopped, the imaging element 13 continues to generate an image signal, the image processor 35 continues to generate image data, and the image data continues to be temporarily recorded onto a buffer memory (not shown). The determiner 33 uses the generated image data to determine whether the image area satisfies the second condition described above. When the second condition is satisfied, or specifically, the lens cover 11 is at the closed position Pc and covers the opening 15, the recording controller 32 continues the stop process. When the second condition is not satisfied, the determiner 33 determines that the lens cover 11 is at the open position Po and the opening 15 is open. In this case, the recording controller 32 ends the stop process and resumes the recording process to record the image data generated by the image processor 35 onto the memory card 48.

During the stop process, the determiner 33 may determine whether the image area satisfies the second condition every time when image data is generated by the image processor 35 (specifically, in every frame), or may determine whether the image area satisfies the second condition for every predetermined number of frames or every predetermined time.

With reference to a flowchart shown in FIG. 4, each process of an imaging method performed by the imaging device 10 will be described. The control unit 31 reads and executes the imaging program recorded on the recording medium 37 to perform the steps in the flowchart.

In step S1, the control unit 31 performs an initialization process such as initialization of a memory. The processing then advances to step S2.

In step S2, the imaging controller 34 causes the imaging element 13 to generate and output an image signal, and causes the image processor 35 to generate image data based on the image signal. The recording controller 32 performs a recording process for recording the image data generated by the image processor 35 onto the memory card 48. The processing then advances to step S3.

In step S3, the determiner 33 determines whether the image area reconstructed by the image data generated by the image processor 35 satisfies the first condition. When the determiner 33 determines that the image area satisfies the first condition, the processing in step S3 advances to the processing in step S4 in response to an affirmative result of determination. When the determiner 33 determines that the image area does not satisfy the first condition, the processing in step S3 is repeated in response to a negative result of determination.

In step S4, the determiner 33 determines whether the image area reconstructed by the image data satisfies the second condition. When the determiner 33 determines that the image area satisfies the second condition, the determiner 33 determines that the lens cover 11 covers the opening 15. The processing in step S4 advances to the processing in step S5 in response to an affirmative result of determination. When the determiner 33 determines that the image area does not satisfy the second condition, the determiner 33 determines that the lens cover 11 does not cover the opening 15. The processing in step S4 is repeated in response to a negative result of determination.

In step S5, the recording controller 32 performs the stop process for stopping recording the image data onto the memory card 48. The processing then advances to step S6.

In step S6, the determiner 33 determines whether the image area reconstructed by the image data satisfies the second condition, similarly to step S4. When the determiner 33 determines that the image area satisfies the second condition, the processing in step S6 is repeated in response to an affirmative result of determination. When the determiner 33 determines that the image area does not satisfy the second condition, the processing in step S6 returns to the processing in step S2 in response to a negative result of determination.

The structure according to the first embodiment produces the advantageous effects described below.

(1) The determiner 33 in the imaging device 10 detects the position of the lens cover 11 based on the generated image data and determines whether the lens cover 11 covers the opening 15. When the determiner 33 determines that the lens cover 11 covers the opening 15, the recording controller 32 stops recording the image data onto the memory card 48. Image data with a low level of priority that does not include the main subject is generated by the image processor 35 when the lens cover 11 is at the closed position Pc. This structure avoids recording image data with a low level of priority onto the memory card 48 and thus reduces unintended consumption of the recording capacity of the memory card 48.

The image data generated by the image processor 35 can be used to determine that the lens cover 11 is at either the closed position Pc or the open position Po. Thus, a detector for detecting the position of the lens cover 11 may not be located inside the housing 12. This reduces an increase in the size and weight of the imaging device 10. In other words, the imaging device 10 can have less internal space.

(2) When determining, based on the generated image data, that the image area satisfies the first condition and satisfies the second condition in which part of light emitted from the light source 23 is reflected from the lens cover 11 and enters the imaging element 13, the determiner 33 determines that the lens cover 11 covers the opening 15. This reduces erroneous determination of the imaging device 10 as being in the closed state when the external environment of the imaging device 10 is dark.

In the first embodiment described above, when the predetermined photographing condition is satisfied, the lens cover 11 is open for photographing. However, the covering and uncovering with the lens cover 11 are not limited to the covering and uncovering with the lens cover 11 under the predetermined photographing condition. In other words, the control unit 31 may not control the covering and uncovering with the lens cover 11. The imaging device 10 in this case will be described in first and second modifications below.

First Modification

Figure 5:
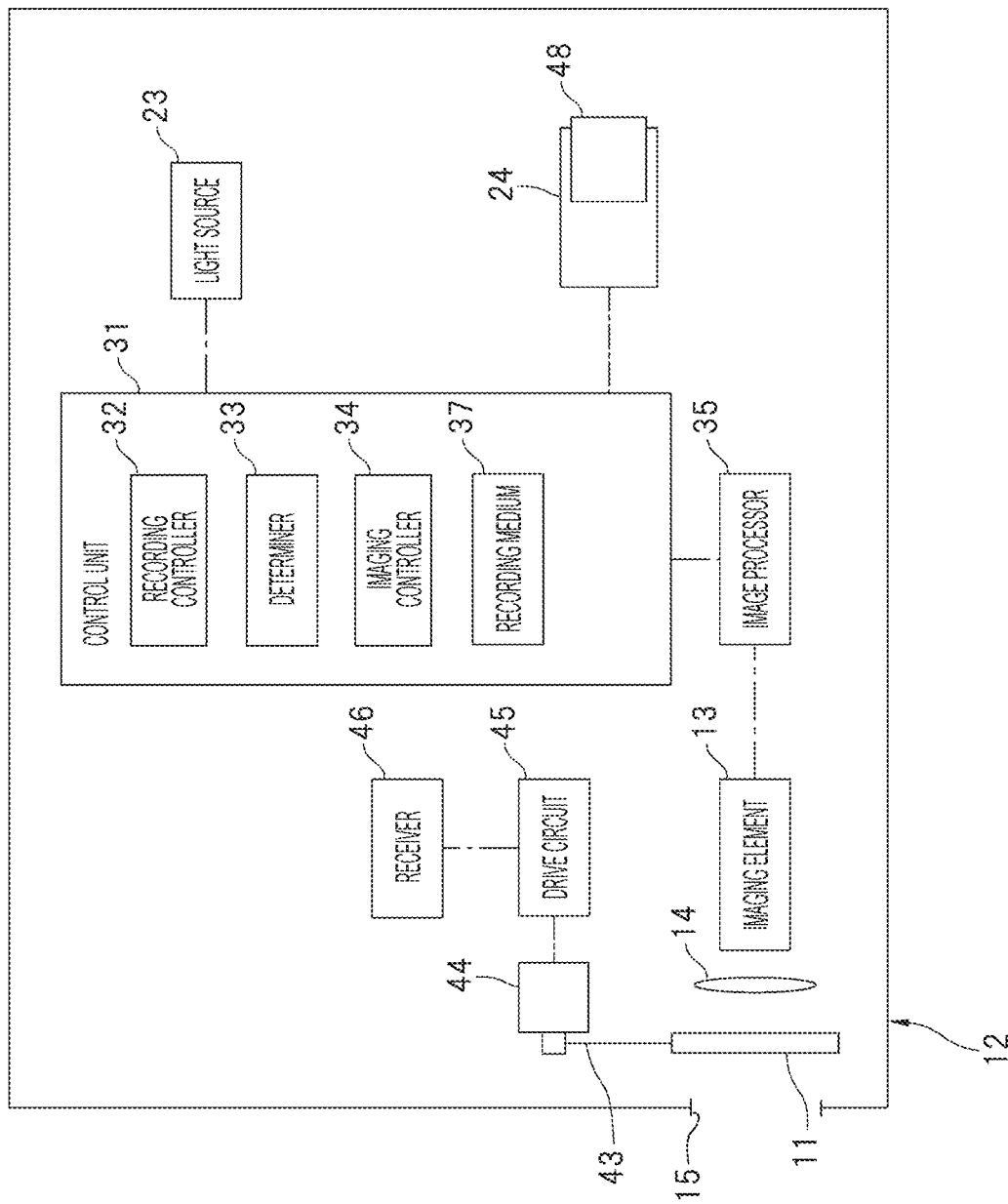
FIG. 5 is a block diagram of a control system in an imaging device according to a first modification.

FIG. 5 is a block diagram of a control system in the imaging device 10 according to a first modification. In the first modification, the control unit 31 does not include the cover controller 36 that controls the covering and uncovering with the lens cover 11, unlike the control unit 31 shown in the block diagram of FIG. 3. The imaging device 10 does not include the first wireless communication module 21 or the second wireless communication module 22 that is used to determine whether the person carrying the wireless tag 40 enters the predetermined photographing area.

In the first modification, the imaging device 10 includes a receiver 46. The receiver 46 includes, for example, a printed circuit board with an antenna and an integrated circuit component mounted on the printed circuit board. The receiver 46 receives a signal output from an external remote control or a portable terminal such as a smartphone. When a user performs an operation to move the lens cover 11 to the open position Po or to the closed position Pc with the remote control or the mobile terminal, the remote control or the mobile terminal outputs a signal reflecting the user operation (operation signal), and the receiver 46 receives the signal. The operation signal received by the receiver 46 is output to the drive circuit 45. The drive circuit 45 drives the actuator 44 in response to the input operation signal to move the lens cover 11 to either the closed position Pc or the open position Po.

The determiner 33 performs the determination process in the same manner as in the first embodiment. In other words, the determiner 33 determines that the lens cover 11 is at the closed position Pc and covers the opening 15 when the image area reconstructed by the generated image data satisfies the first condition and the second condition. When the lens cover 11 is at the closed position Pc, the recording controller 32 performs the stop process.

Thus, although the control unit 31 does not control the covering and uncovering operations with the lens cover 11, the determiner 33 uses the image data to detect the position of the lens cover 11 and determines whether the lens cover 11 covers the opening 15. Thus, the imaging device 10 according to the first modification also produces the same advantageous effects as described in the first embodiment.

Second Modification

Figure 6:
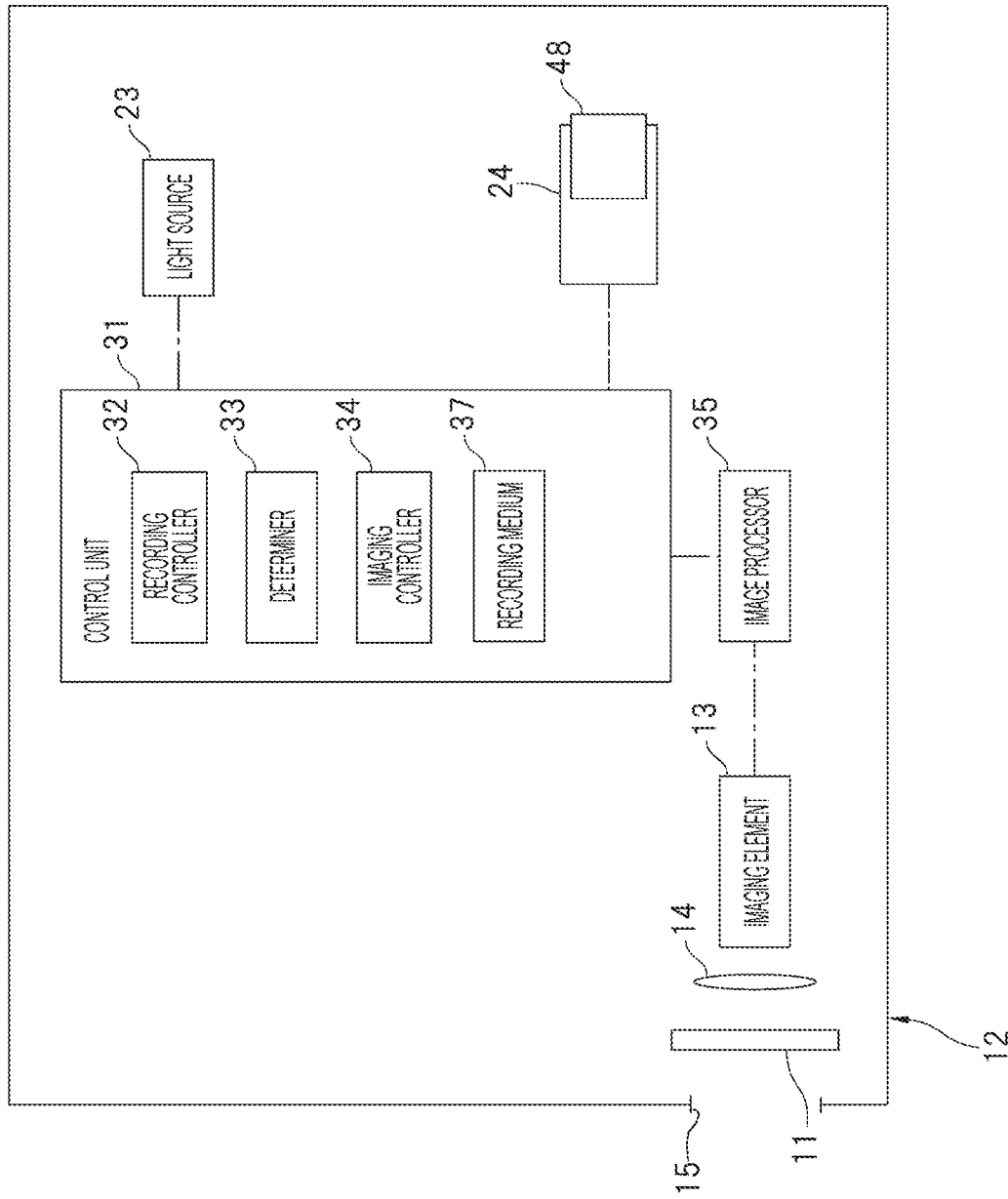
FIG. 6 is a block diagram of a control system in an imaging device according to a second modification.

FIG. 6 is a block diagram of a control system in the imaging device 10 according to a second modification. In the second modification, the user manually moves the lens cover 11 between the open position Po and the closed position Pc. In other words, the imaging device 10 according to the second modification does not include the drive circuit 45, the actuator 44, or the link assembly 43 for driving the lens cover 11. As in the first modification, the imaging device 10 according to the second modification does not include the cover controller 36 in the control unit 31, the first wireless communication module 21, or the second wireless communication module 22.

The determiner 33 performs the determination process on the lens cover 11 manually movable between the open position Po and the closed position Pc, in the same manner as in the first embodiment. In other words, the determiner 33 determines that the lens cover 11 is at the closed position Pc and covers the opening 15 when the image area reconstructed by the generated image data satisfies the first condition and the second condition. When the lens cover 11 is at the closed position Pc, the recording controller 32 performs the stop process.

Thus, although the control unit 31 does not control the covering and uncovering operations with the lens cover 11, the determiner 33 uses the image data to detect the position of the lens cover 11 and determines whether the lens cover 11 covers the opening 15. Thus, the imaging device 10 according to the second modification also produces the same advantageous effects as described in the first embodiment.

When the lens cover 11 is additionally incorporated in an existing imaging device including no lens cover 11, the position of the lens cover 11 can be detected without additionally incorporating a detector for detecting the position of the lens cover 11 to perform the stop process.

Second Embodiment

An imaging device according to a second embodiment will be described with reference to the drawings. In the example described below, the same components as in the first embodiment are given the same reference numerals, and the differences will be mainly described. The components that are not particularly described are the same as the corresponding components in the first embodiment.

Figure 7:
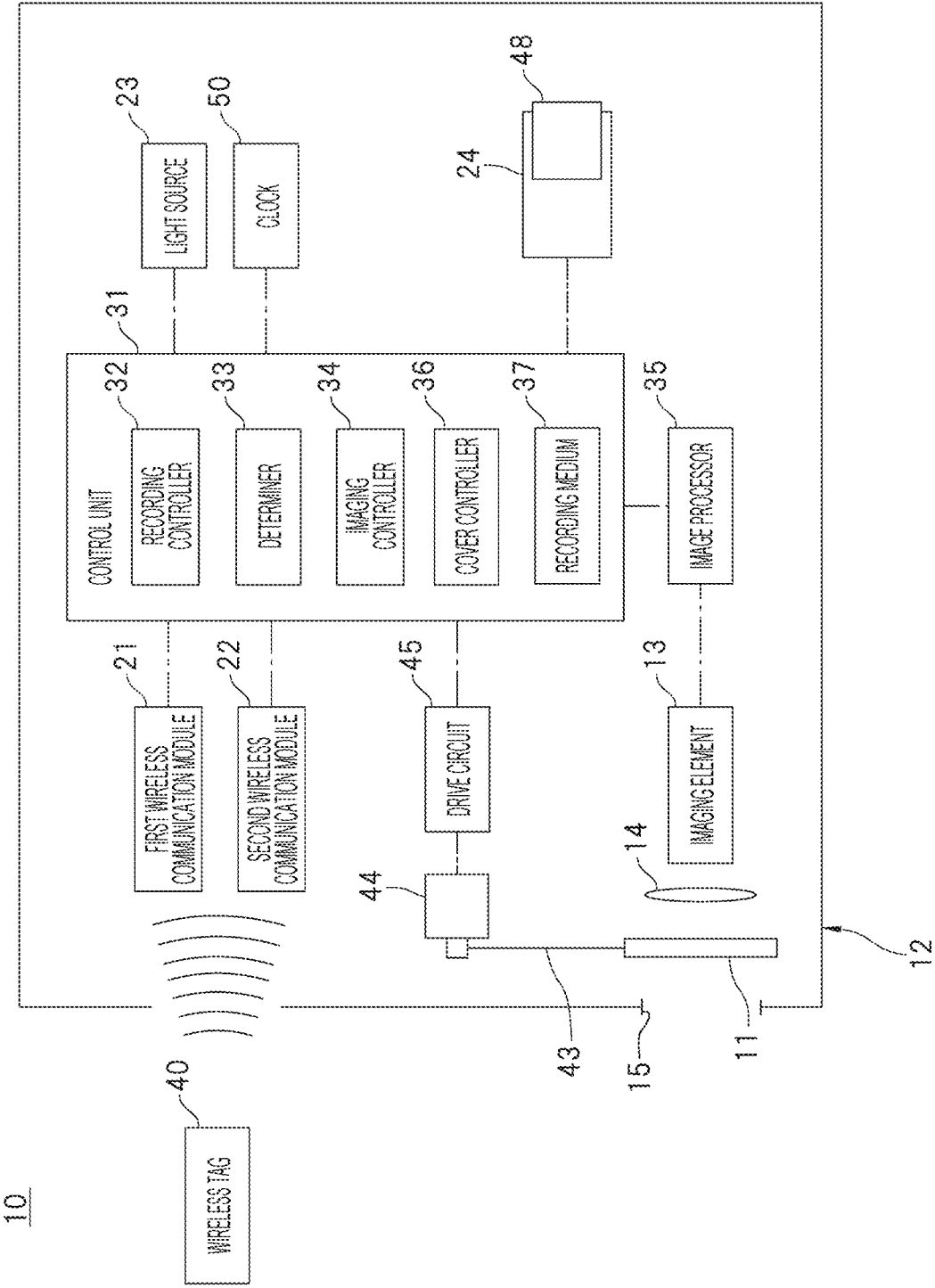
FIG. 7 is a block diagram of a control system in an imaging device according to a second embodiment.

FIG. 7 is a block diagram of a control system in the imaging device 10 according to the second embodiment. The imaging device 10 according to the second embodiment includes a clock 50 for obtaining time data. The clock 50 may be a clock with a known quartz oscillator or a radio clock. The other components of the imaging device 10 are the same as the corresponding components in the first embodiment shown in FIG. 3. In the second embodiment, when the lens cover 11 changes from a state (closed state) in which the lens cover 11 covers the opening 15 to restrict the subject light from entering the imaging element 13 to the open state in which the lens cover 11 releases the restriction of entry of the subject light into the imaging element 13, the imaging controller 34 in the control unit 31 performs a process (adjustment process) for reducing the amplification factor (gain) to be used by the image processor 35 to amplify an image signal and generate image data.

Adjustment Process

The imaging controller 34 controls the amplification factor of the image signal through automatic gain control (AGC) based on the generated image data. When the external environment of the imaging device 10 is dark or the lens cover 11 is at the closed position Pc, the amount of light entering the imaging element 13 is small. In contrast, when the lens cover 11 is at the open position Po, the amount of light entering the imaging element 13 is greater than that when the lens cover 11 is at the closed position Pc. Thus, when controlling the amplification factor of the image signal through AGC, the imaging controller 34 sets the amplification factor to an amplification factor (first amplification factor) in which the amplification factor when the lens cover 11 is at the closed position Pc is higher than the amplification factor when the lens cover 11 is at the open position Po.

The lens cover 11 moves from the closed position Pc to the open position Po, the imaging device 10 is then in the open state, and the amount of light entering the imaging element 13 increases. In this case, when the image signal output from the imaging element 13 is amplified at the high amplification factor (first amplification factor), halation may occur in the generated image data. To reduce such halation, the imaging controller 34 performs the adjustment process for setting the amplification factor to the image signal used to generate image data by the image processor 35 to a predetermined amplification factor. In the adjustment process, the imaging controller 34 sets the amplification factor to be used by the image processor 35 to a lower amplification factor (second amplification factor) than the first amplification factor. The imaging controller 34 then controls the amplification factor to be used by the image processor 35 through AGC based on the generated image data.

The imaging controller 34 determines the second amplification factor based on adjustment data recorded on the recording medium 37 in the control unit 31. The adjustment data is associated with an amplification factor and time. When the amplification factor to be used by the image processor 35 at 9:00 am is controlled through AGC with, for example, the lens cover 11 at the open position Po, the time and the amplification factor to be used by the image processor 35 at the time are associated and recorded onto the recording medium 37 as the adjustment data. In other words, the adjustment data is an amplification factor on each hour when the amplification factor is controlled through AGC with the lens cover 11 at the open position Po. Thus, the adjustment data is a lower amplification factor than the amplification factor when the lens cover 11 is at the closed position Pc.

When the determiner 33 determines that the second condition is not satisfied in the determination process performed during the stop process described in the first embodiment (specifically, the lens cover 11 is at the open position Po), the imaging controller 34 performs the adjustment process. The imaging controller 34 obtains, from the clock 50, the time data when the lens cover 11 moves to the open position Po. The imaging controller 34 refers to the adjustment data and reads the amplification factor associated with the same time as the obtained time data. The imaging controller 34 sets the read amplification factor as the amplification factor (second amplification factor) to be used by the image processor 35. The amplification factor of the adjustment data is lower than the amplification factor when the lens cover 11 is at the closed position Pc as described above. Thus, the second amplification factor to be used by the image processor 35 through the adjustment process is set to be lower than the first amplification factor. When the obtained time is not the hour, for example, 9:30 am, the imaging controller 34 may set the average of the amplification factor associated with 9:00 am and the amplification factor associated with 10:00 am as the second amplification factor to be used by the image processor 35.

Figure 8:
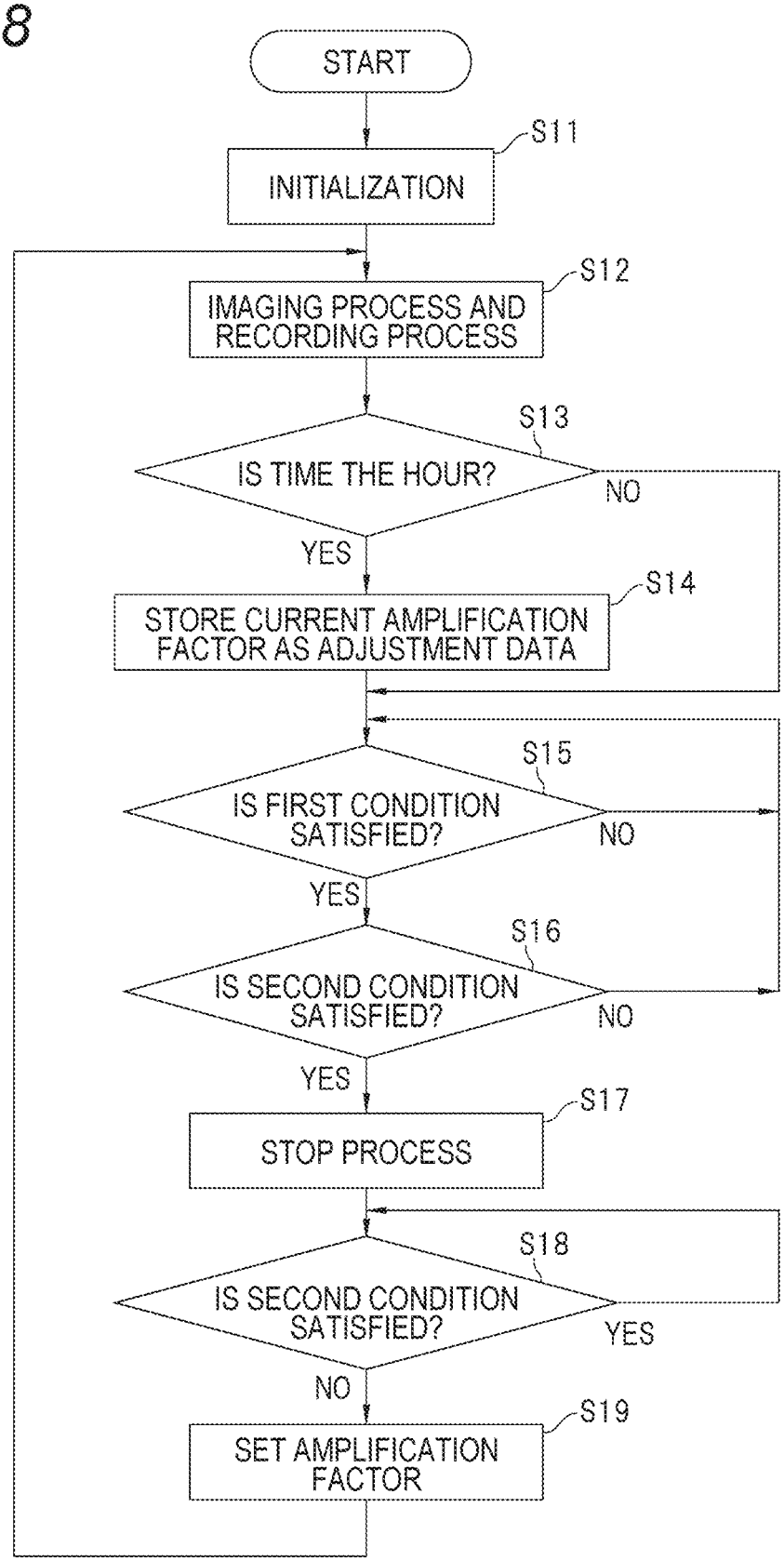
FIG. 8 is a flowchart of the operation of the imaging device according to the second embodiment.

With reference to the flowchart shown in FIG. 8, the process performed by the control unit 31 will be described. The control unit 31 reads and executes the program recorded on the recording medium 37 to perform the steps in the flowchart.

Figure 4:
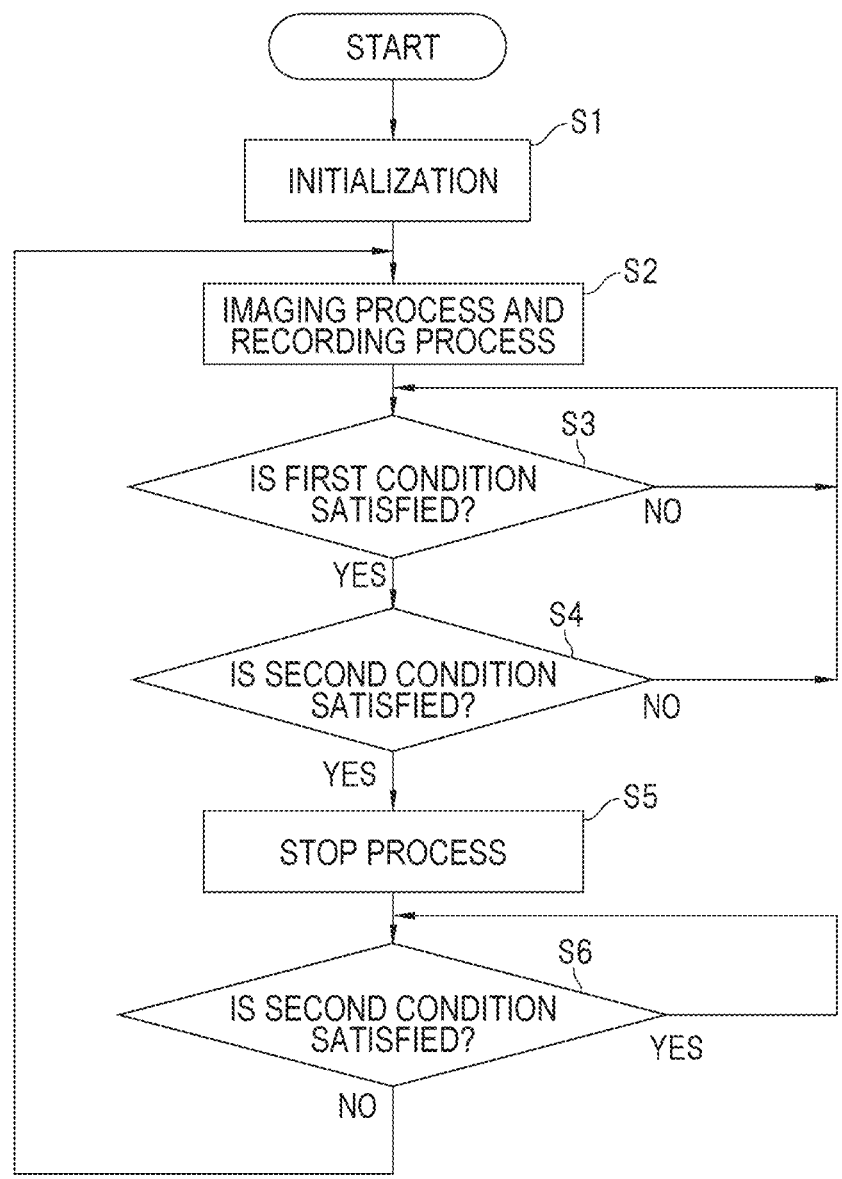
FIG. 4 is a flowchart of the operation of the imaging device according to the first embodiment.

In steps S11 and S12, the same processing as in steps S1 and S2 in the flowchart described in the first embodiment shown in FIG. 4 is performed.

In step S13, the imaging controller 34 obtains image data from the clock 50 and determines whether the current time is the hour. When the current time is the hour, the determination in step S13 yields an affirmative result, and the processing advances to step S14. When the current time is not the hour, the determination in step S13 yields a negative result, and the processing skips step S14 and advances to step S15.

In step S14, the imaging controller 34 associates the amplification factor that is controlled through AGC with the time data obtained in step S13 and records the associated amplification factor and the time data as the adjustment data. The processing then advances to step S15.

In steps S15 to S18, the same processing as in steps S3 and S6 in the flowchart described in the first embodiment shown in FIG. 4 is performed. When the determination in step S18 yields a negative result, the processing advances to step S19.

In step S19, the imaging controller 34 obtains the time data when the lens cover 11 is determined to be at the closed position Pc in step S18. The imaging controller 34 refers to the adjustment data based on the obtained time data and sets the amplification factor associated with the time data to the second amplification factor to be used by the image processor 35. The processing then returns to step S12.

The second embodiment described above produces the advantageous effects described below, in addition to the advantageous effects (1) and (2) described in the first embodiment.

When the lens cover 11 releases the restriction of entry of the subject light into the imaging element 13 (closed state) in which the lens cover 11 covers the opening 15 to restrict the subject light from entering the imaging element 13, the imaging controller 34 reduces the amplification factor to be used by the image processor 35. In this case, the amplification factor recorded as the adjustment data is set as the second amplification factor. Thus, the amplification factor can be reduced in a shorter time than when the amplification factor to be used by the image processor 35 is reduced through AGC. When the lens cover 11 moves from the closed position Pc to the open position Po, image data is generated at a high amplification factor, and halation in the image data is reduced. As a result, the imaging device 10 is prevented from failing to function as a surveillance camera when the lens cover 11 is open.

Although the imaging device 10 according to the second embodiment described above includes the clock 50 in addition to the structure of the imaging device 10 according to the first embodiment shown in FIG. 3, the imaging device 10 is not limited to this structure. The imaging device 10 may be the imaging device 10 according to the first modification shown in FIG. 5 or the second modification shown in FIG. 6 including the clock 50.

Although various embodiments and modifications are described above, the present invention is not limited to the embodiments and the modifications. Other forms implementable within the scope of technical idea of the present invention fall within the scope of the present invention.

Although the recording controller 32 records image data onto the memory card 48 attached to the imaging device 10 in the first and second embodiments and the first and second modifications, the present invention is not limited to these embodiments and modifications. The recording controller 32 may record image data onto a recording medium external to the imaging device 10. In this case, the recording controller 32 may transmit the generated image data with a wire or wirelessly and record the image data onto the external recording medium.

What is claimed is:

1. An imaging device, comprising:
an imaging unit configured to receive subject light through an opening in a housing and generate image data;
a recording controller configured to record the image data generated by the imaging unit onto a recording medium;
a light shield movable to a position at which the light shield covers the opening to restrict the subject light from entering the imaging unit;
a determiner configured to detect a position of the light shield based on the image data generated by the imaging unit and determine whether the light shield covers the opening,
wherein the recording controller stops recording the image data onto the recording medium when the determiner determines that the light shield covers the opening; and
an imaging controller configured to reduce an amplification factor of a signal for the imaging unit to generate the image data to a predetermined amplification factor after the light shield changes from a state in which the light shield covers the opening to restrict the subject light from entering the imaging unit to a state in which the light shield releases restriction of entry of the subject light into the imaging unit.

2. The imaging device according to claim 1, further comprising:
a light source inside the housing and configured to emit light,
wherein the determiner determines that the light shield covers the opening when determining, based on the image data, that an image area satisfies a predetermined condition and that part of light emitted from the light source is reflected from the light shield and enters the imaging unit.

3. The imaging device according to claim 2, wherein the determiner determines that the image area satisfies the predetermined condition when luminance of an area with a predetermined proportion of the image area is less than a threshold.

4. The imaging device according to claim 2, wherein the determiner determines that the image area satisfies the predetermined condition when luminance of a central portion of the image area is lower than luminance of a peripheral portion of the image area.

5. The imaging device according to claim 2, wherein the determiner determines that the image area satisfies the predetermined condition when the image area does not include a main subject.

6. The imaging device according to claim 2, wherein the determiner determines that part of light emitted from the light source is reflected from the light shield and enters the imaging unit when luminance at a predetermined position of the image area exceeds a threshold based on the image data.

7. A non-transitory computer readable medium configured to store instructions for causing processes to be performed, the processes comprising:
receiving, with an imaging unit, subject light through an opening in a housing and generating image data;
recording the generated image data onto a recording medium;
determining, based on the generated image data, whether a light shield is at a position at which the light shield covers the opening to restrict the subject light from entering the imaging unit;
stopping recording the image data onto the recording medium when the subject light is determined to be restricted from entering the imaging unit; and
reducing an amplification factor of a signal for the imaging unit to generate the image data to a predetermined amplification factor after the light shield changes from a state in which the light shield covers the opening to restrict the subject light from entering the imaging unit to a state in which the light shield releases restriction of entry of the subject light into the imaging unit.

8. An imaging method, comprising:
receiving, with an imaging unit, subject light through an opening in a housing and generating image data;
recording the generated image data onto a recording medium;
determining, based on the image data generated by the imaging unit, whether a light shield is at a position at which the light shield covers the opening to restrict the subject light from entering the imaging unit;
stopping recording the image data onto the recording medium when the light shield is determined to cover the opening; and
reducing an amplification factor of a signal for the imaging unit to generate the image data to a predetermined amplification factor after the light shield changes from a state in which the light shield covers the opening to restrict the subject light from entering the imaging unit to a state in which the light shield releases restriction of entry of the subject light into the imaging unit.

* * * * *